US006327274B1

(12) United States Patent
Ravikanth

(10) Patent No.: US 6,327,274 B1
(45) Date of Patent: Dec. 4, 2001

(54) METHOD FOR ESTIMATING RELATIVE SKEW BETWEEN CLOCKS IN PACKET NETWORKS

(75) Inventor: Rayadurgam Ravikanth, Burlington, MA (US)

(73) Assignee: Nokia Telecommunications, Inc., Espoo (FI)

( * ) Notice: Subject to any disclaimer, the term of this patent is extended or adjusted under 35 U.S.C. 154(b) by 0 days.

(21) Appl. No.: 09/153,280

(22) Filed: Sep. 15, 1998

(51) Int. Cl.[7] .......................... H04J 3/06
(52) U.S. Cl. .......................... 370/516; 375/371
(58) Field of Search .......................... 370/516, 503, 370/509, 507; 375/371; 348/497; 709/248

(56) References Cited

U.S. PATENT DOCUMENTS

| | | | | |
|---|---|---|---|---|
| 5,602,992 | * | 2/1997 | Danneels | 709/248 |
| 5,822,381 | * | 10/1998 | Parry et al. | 325/356 |
| 5,918,040 | * | 6/1999 | Jarvis | 375/358 |
| 5,966,387 | * | 10/1999 | Cloutier | 370/516 |
| 5,991,307 | * | 11/1999 | Komuro et al. | 370/433 |
| 6,073,246 | * | 6/2000 | Song et al. | 713/401 |

OTHER PUBLICATIONS

"Framework for IP Performance Metrics"; Paxson et al.; *Internet Engineering Task Force*, ftp://ftp.isi.edu/in–notes/rfc2330.txt, 1998, 63 pages.

"On Calibrating Measurements of Packet Transit Times", V. Paxson, *Sigmetrics '98/Performance '98, Joint International Conference on Measurement and Modeling of Computer Systems*, vol. 26, No. 1, Jun. 22–26, 1998, pp. 11–21.

"Measurements and Analysis of End–to–End Internet Dynamics", internet site, ftp://ftp.ee.lbl.gov/papers/vp–thesis/dis, Apr. 1997, 386 pages.

"On Assessing Unidirectional Latencies In Packet–Switched Networks"; Fasbender et al., *IEEE International Conference On Communications*, vol. 1, Jun. 8–12, 1997 pp. 490–494.

Paxson, V., "Measurements and Analysis of End–to–End Internet Dynamics", Ph.D. Thesis; University of California, Berkeley; pp. 212–231 (Apr. 1997).

* cited by examiner

*Primary Examiner*—Douglas Olms
*Assistant Examiner*—Ken Vanderbuye
(74) *Attorney, Agent, or Firm*—Altera Law Group, LLC

(57) ABSTRACT

A method, a system, and an article of manufacture for measuring a relative skew between clocks in a packet based communication network. The method utilizes the timestamps available in packets sent from a sender to a receiver, as well as the times at which the receiver receives such packets. Such timestamps can be incorporated in packets, or in a separate protocol.

9 Claims, 2 Drawing Sheets

METHOD FOR ESTIMATING RELATIVE SKEW BETWEEN CLOCKS IN PACKET NETWORKS

BACKGROUND OF THE INVENTION

1. Field of the Invention

The present invention relates in general to communication systems, and more particularly, to a method and system for measuring/estimating the relative skew between clocks in a packet based communication networks.

2. Description of Related Art

Estimating the relative skew between clocks on different host machines (or referred to network nodes) in a packet network environment, such as the Internet, is relatively new since real-time applications and usage based pricing are relatively new concepts. The issue of measuring one way transit times of packets is becoming increasingly important with the emergence of real-time applications such as voice and video over the Internet. This concept of one-way transit time measurements involves comparing (specifically, taking differences of) times measured with respect to different clocks (e.g. the sender and receiver clocks). Two of the main sources of clock timing discrepancy are offset and skew. Offsets can be readily corrected. The most widely used remedy for clock offsets is a form of synchronization (e.g. using Network Time Protocol (NTP), or Global Positioning System (GPS), etc.). It should be noted, though, this synchronization zeros the clock difference between two clocks at one instant, but the clock skew will inherently cause the clocks to drift apart as time progresses. Accordingly, a clock skew can impose a serious clock timing discrepancy problem for a real-time application.

Accordingly, there is a need to develop a method to detect/correct clock skews. Specifically, there is a need to develop a method of measuring/estimating the relative skew between clocks on different host machines (or referred to network nodes) in a packet network environment such as the Internet. The present invention provides a solution to the above and other problems and offers advantages over the existing network systems.

SUMMARY OF THE INVENTION

To overcome the limitations in the prior art described above, and to overcome other limitations that will become apparent upon reading and understanding the present specification, the present invention discloses a method and system for estimating the relative skew between clocks in a packet communication network.

The present invention provides a method of detecting the existence of a clock skew between two different clocks. The clock offsets are predefined by a separate synchronization mechanism based on Network Time Protocol (NTP) and/or Global Positioning System (GPS) based systems. It is appreciated that other clock synchronization mechanisms can be used within the scope of the present invention.

In one embodiment of the present invention, a method for determining a clock skew between at least a first and second clocks in a network includes: transmitting a plurality of packets from a first network node to a second network node, each of the packets having a timestamp which records time measured by the first clock at the first network node; receiving one of the packets at the second network node and recording time measured by the second clock at the second network node; obtaining the timestamp of the one packet recorded at the first clock; computing a time delay between a time of transmitting the one packet and a time of receiving the one packet; computing a jitter between the time delay for the one packet and the time delay for a next packet consecutively transmitted after the one packet; averaging jitters after transmitting the plurality of packets; averaging inter-packet times, each of the inter-packet times being a time interval between transmitting two consecutive of the plurality of packets at the first network node; and determining the clock skew by dividing an average of the jitters by an average of the inter-packet times.

Further in one embodiment, the network is a packet based communication network.

Still in one embodiment, the time recordings by the first and second clocks are relative to a global clock.

The present invention is also a system of determining a clock skew between at least a first and second clocks in a network. In one embodiment, the system includes means for transmitting a plurality of packets from a first network node to a second network node, each of the packets having a timestamp which records time measured by the first clock at the first network node; means for receiving one of the packets at the second network node and recording time measured by the second clock at the second network node; and means for determining a clock skew between the first and second clocks based on the timestamps and the time measured by the second clock.

Further in one embodiment, the clock skew determining means includes means for obtaining the timestamp of the one packet recorded at the first clock; means for computing a time delay between a time of transmitting the one packet and a time of receiving the one packet; means for computing a jitter between the time delay for the one packet and the time delay for a next packet consecutively transmitted after the one packet; a first averager averaging jitters after transmitting the plurality of packets; and a second averager averaging inter-packet times, each of the inter-packet times being a time interval between transmitting two consecutive of the plurality of packets at the first network node; wherein the clock skew is determined by dividing an average of the jitters by an average of the inter-packet times.

Further, the present invention provides an article of manufacture for a computer-based data processing system, the article of manufacture including a computer readable medium having instructions for causing a computer to perform a method for determining a clock skew between at least a first and second clocks in a network, includes: transmitting a plurality of packets from a first network node to a second network node, each of the packets having a timestamp which records time measured by the first clock at the first network node; receiving one of the packets at the second network node and recording time measured by the second clock at the second network node; obtaining the timestamp of the one packet recorded at the first clock; computing a time delay between a time of transmitting the one packet and a time of receiving the one packet; computing a jitter between the time delay for the one packet and the time delay for a next packet consecutively transmitted after the one packet; averaging jitters after transmitting the plurality of packets; averaging inter-packet times, each of the inter-packet times being a time interval between transmitting two consecutive of the plurality of packets at the first network node; and determining the clock skew by dividing an average of the jitters by an average of the inter-packet times.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
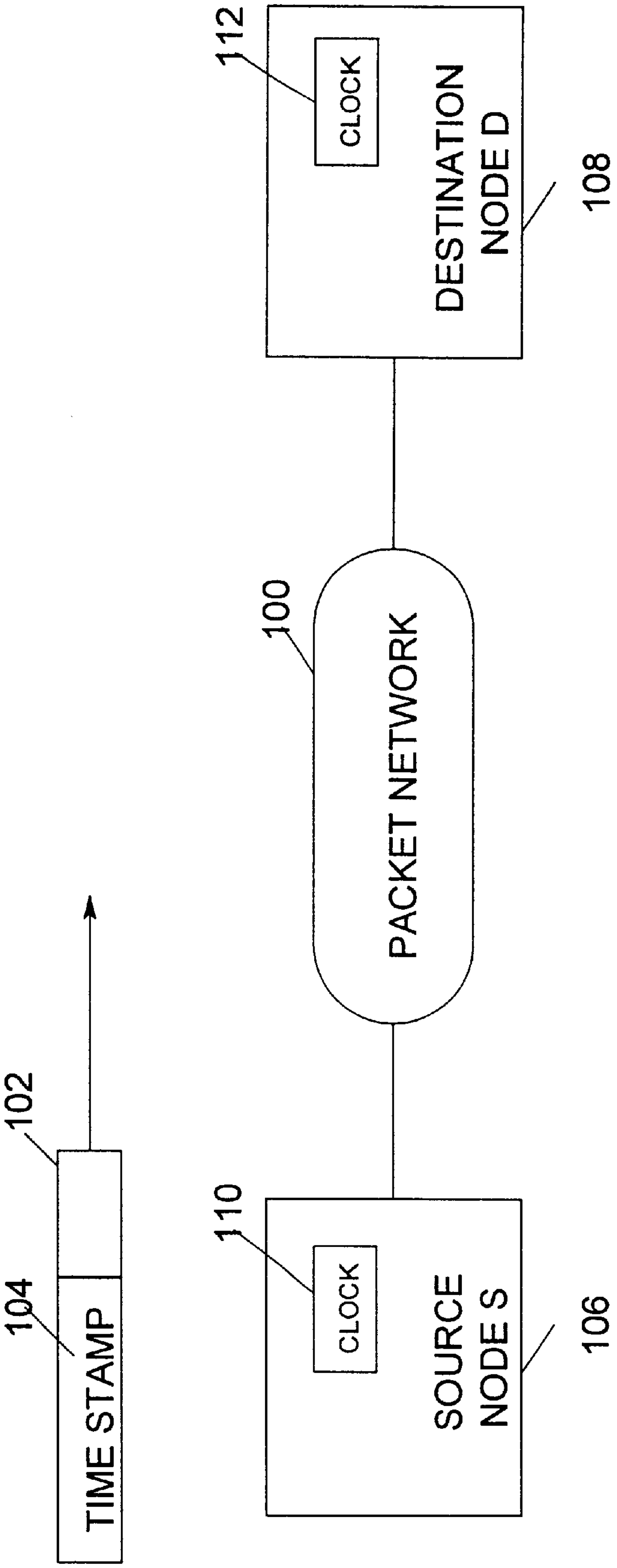
FIG. 1 illustrates a schematic view of one skew measurement scheme in a packet based communication network in accordance with the present invention.

The present invention relates in general to communication systems, and more particularly, to a method and system for measuring/estimating the relative skew between clocks in a packet based communication network.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention. It is appreciated that the present invention can be used for real-time applications on Internet or other communication networks.

The acronym used in the present invention are as follows:

| | |
|---|---|
| NTP | Network Time Protocol |
| GPS | Global Positioning System |
| $t_g$ | Time as measured by a global clock, which is considered to be the "true time" |
| $T_i$ | Time as measured by clock i. |
| $R_i$ | Skew of clock i with respect to the global clock |
| $C_i$ | Offset of clock i with respect to the global clock at $t_g = 0$. |
| S | Sender or Source Network Node |
| D | Receiver or Destination Network Node |
| $R_S$ | Clock skew at S with respect to the global clock |
| $C_S$ | Clock offset at S with respect to the global clock at $t_g = 0$. |
| $R_D$ | Clock skew at D with respect to the global clock |
| $C_D$ | Clock offset at D with respect to the global clock at $t_g = 0$. |
| $T_{N,sent,S}$ | Time at which packet N is sent by a host machine of a sender S |
| $T_{N,received,D}$ | Time at which packet N is received by a host machine of a receiver D |
| $Del_{N,D}$ | Delay of packet N measured by the receiver D |
| $Del_{N,g}$ | Delay measured by the global clock when $R_D = R_S = 1$ and $C_S = C_D$ |
| $J_{N+1,D}$ | Jitter measured by the receiver D |
| $R_{rel,S,D}$ | Relative skew defined by RD/RS |
| $E_{av}(J_{N+1,D})$ | Average of the jitter measured by the receiver D. |
| IPPM | Internet Protocol Performance Metrics (IPPM is a working group of the Internet Engineering Task Force) |
| RTP | Real-time Transport Protocol |

The present invention provides a way of measuring/estimating the relative skew between different clocks in a packet based communication network. A preferred method utilizes timestamps available in packets sent from a sender S to a receiver D, as well as the times at which the receiver D receives such packets. The timestamps can be carried in the packet sent from the sender S to the receiver D, such that the timestamps can be read by the receiver's host computer. It is appreciated that the timestamps may be directly implemented in packets or implemented by using a separate protocol so that the same measurement can be performed. Accordingly, a clock skew measurement scheme of the present invention can be integrated into a real-time application or can be used in conjunction with new protocols specifically designed to measure the performance of packet networks such as Internet.

Clock Issues

As defined above, $t_g$ represents the time measured by a global clock, which is considered as the "true" time; $T_i$ represents the time measured by a clock i at a network node i. The relation between $T_i$ and $t_g$ is as follows:

$$T_i = R_i * t_g + C_i$$

where $R_i$ is the skew of clock i with respect to the global clock, and $C_i$ is the offset of the clock i with respect to the global clock at tg=0. In a preferred embodiment, the skew $R_i$ is a constant parameter and does not vary with time. It is appreciated that the skew may vary with time in which cases they may be different.

In general, clocks on different machines have different skews and offsets with respect to the global clock. As a result, there may be a difference between packet delays measured by the receiver D and the actual delay measured by the global clock. For clear illustration, a time point is defined in a network as follows: $T_{N,sent,S}$ represents the time at which packet N was sent by the host machine of the sender S, and the time is measured by the clock of the sender S. Alternately, the second suffix can be received, and the third suffix can be any host index, such as g representing the global clock, or D representing the receiver's clock.

From the above definition of times, $T_{N,sent,S} = R_S * T_{N,sent,g} + C_S$. Specifically, this is the timestamp (as, for instance, in the RTP timestamp) marked by S when the sender sends the packet N. Similarly, when the packet N is received at the destination node (i.e. the receiver D), the time that the packet N is received is $T_{N,received,D}$, ($T_{N,received,D} = R_D * T_{N,received,g} + C_D$). Accordingly, the delay experienced by packet N, measured by the destination node D, is:

$$Del_{N,D} = T_{N,received,D} - T_{N,sent,S}.$$

It is appreciated that this measured delay coincides with the actual delay, $Del_{N,g}$ measured by the global clock, if and only if (i) RD=RS=1 and (ii) CS=CD.

The clock timing discrepancy are clock offset and skew. In the preferred embodiment, the present invention determines how much a relative offset between two clocks is. As mentioned in the background of the invention, offsets can be readily corrected by clock synchronization (using NTP, GPS etc.). It should be noted, though, that synchronization merely zeros the clock difference between two clocks at one moment, but the skew causes the clocks to drift apart as time progresses. Thus, the clock skew detection becomes an important issue in resolving clock timing discrepancy problem. A preferred method of detecting clock skew in accordance with the present invention is discussed below in details.

Clock Skew Detection

One of the main ideas behind a preferred method of detecting clock skews is that a sequence of packets transmitted from the source node (sender S) to the destination node (receiver D) are monitored. The delays of the packets are determined by the receiver D. It is appreciated that this paradigm can be used for one which uses a separate protocol to generate this sequence of packets, or for one which just uses data packets (time stamped UDP (User Datagram Protocol) packets, such as ones used by multimedia applications) to dynamically perform this measurement.

As an example, consider the two consecutive packets N and N+1 which are sent by the sender S to the receiver D. The delay suffered by the two packets are:

$$Del_{N,D}=T_{N,received,D}-T_{N,sent,S} \text{ and } Del_{N+1,D}=T_{N+1,received,D}-T_{N+1,sent,S},$$

respectively. Thus, a jitter measured by the receiver D is:

$$J_{N+1,D}=Del_{N+1,D}-Del_{N,D}$$

Substituting the detailed definitions of the quantities on the right hand side of this equality, $$J_{N+1,D}=T_{N+1,received,D}-T_{N+1,sent,S}-(T_{N,received,D}-T_{N,sent,S})$$

$$=R_D*T_{N+1,received,g}+C_D-(R_S*T_{N+1,sent,g}+C_S)-((R_D*T_{N,received,g}+C_D)-(R_S*T_{N,sent,g}+C_S))$$

$$=R_D*T_{N+1,received,g}-(R_S*T_{N+1,sent,g})-((R_D*T_{N,received,g})-(R_S*T_{N,sent,g}))$$

Accordingly, the constant offset disappears when jitter is computed. To determine the relative skew $Rrel_{S,D}$, the $Rrel,_{S,D}=R_D/R_S$. Thus, $$J_{N+1,D}=R_D*(T_{N+1,received,g}-T_{N+1,sent,g}-(T_{N,received,g}-T_{N,sent,g}))+(R_D-R_S)*(T_{N+1,sent,g}-T_{N,sent,g})$$

$$=R_D*(Del_{N+1,g}-Del_{N,g})+(R_D-R_S)*(T_{N+1,sent,g}-T_{N,sent,g})$$

$$=R_D*(J_{N+1,g})+(R_D-R_S)*(T_{N+1,sent,g}-T_{N,sent,g}),$$

where $J_{N+1,g}$ is the jitter measured by the global clock. $T_{N+1,sent,g}$ and $T_{N,sent,g}$ can then be rewritten in terms of the timestamp put in by the senders. Thus, $$J_{N+1,D}=R_D*(J_{N+1,g})+(R_D-R_S)*((T_{N+1,sent,S}-C_S)/R_S-(T_{N,sent,S}-C_S)/R_S)$$

$$=R_D(J_{N+1,g})+(T_{N+1,sent,S}-T_{N,sent,S})*(R_D-R_S)/R_S$$

$$=R_D(J_{N+1,g})+(T_{N+1,sent,S}-T_{N,sent,S})*(Rrel_{S,D}-1).$$

Accordingly, the above expression allows one to measure the relative skew $Rrel_{S,D}$. By taking averages (ensemble or time averages, either denoted by Eav(.)) on both sides of the above equality, then $$E_{av}(J_{N+1,D})=E_{av}(T_{N+1,sent,S}-T_{N,sent,S})*(Rrel,_{S,D}-1),$$

where $Eav(J_{N+1,g})=0$. The validity of this fact can be seen in the stochastic sense since a jitter is the difference of two delays, which may be assumed to be identically distributed in the stochastic sense. In the time average sense, the explanation for this is that a non-zero mean can imply that the delays are exploding to infinity (positive average case) or they are going to be zero (negative average case). Now, note that if the source node S is sending packets at some average time interval denoted by $T_{inter\text{-}packet}$, then $$E_{av}(J_{N+1,D})=T_{inter\text{-}packet}*(Rrel_{S,D}-1).$$

In the above relation, all quantities, except for the relative skew $Rrel_{S,D}$, are known. Therefore, the relative skew can be readily dividing the average jitter $E_{av}(J_{N+1,D})$ by the average time interval $T_{inter\text{-}packet}$. In a preferred embodiment, the time average approach is used. It is appreciated that other average approach, such as ensemble average approach, can be used within the scope of the present invention.

Usage of the Skew Determination Test

In accordance with the above scheme, in one embodiment, a sequence of packets are sent from a sender to a receiver. A number of observations are made to obtain a more accurate estimate of the clock skew. The packets can be sent at a fixed intervals of time. It is appreciated, however, that the packets need not be sent at fixed intervals of time since all it is needed is the time average of the timestamps from the sender. Thus, if, for example, a Poisson sampling is used to generate the packet generation times, this method can remain unchanged.

The above method can be utilized in conjunction with existing applications. Real-time applications, such as some video-conferencing applications, e.g. H.323 (a protocol which enables packet based multimedia communication system) based video-conferencing applications, may need to know timing information, and hence may require the receiver to estimate the relative skew between its clock and the sender's clock. In such a situation, the timestamps available in the Real-time Transport Protocol (RTP) header of the data packets may be sufficient for the receiver to estimate/measure the relative skew. Thus, this method can potentially be integrated into applications.

Relative Skew Measurement Implementation

One implementation of the above clock skew determination method is described below.

FIG. 1 illustrates a block diagram of skew measurement scheme in a packet based communication network 100. Packets 102, each having a timestamp 104 (either incorporated in an application or in a separate protocol), are sent from a source node 106 to a destination node 108 over the network 100. The destination node D108 measures the relative skew between a clock 110 at the source node 106 and a clock 112 at the destination node 108 by using a stream of consecutive packets from the source node 106 to the destination node 108.

Figure 2:
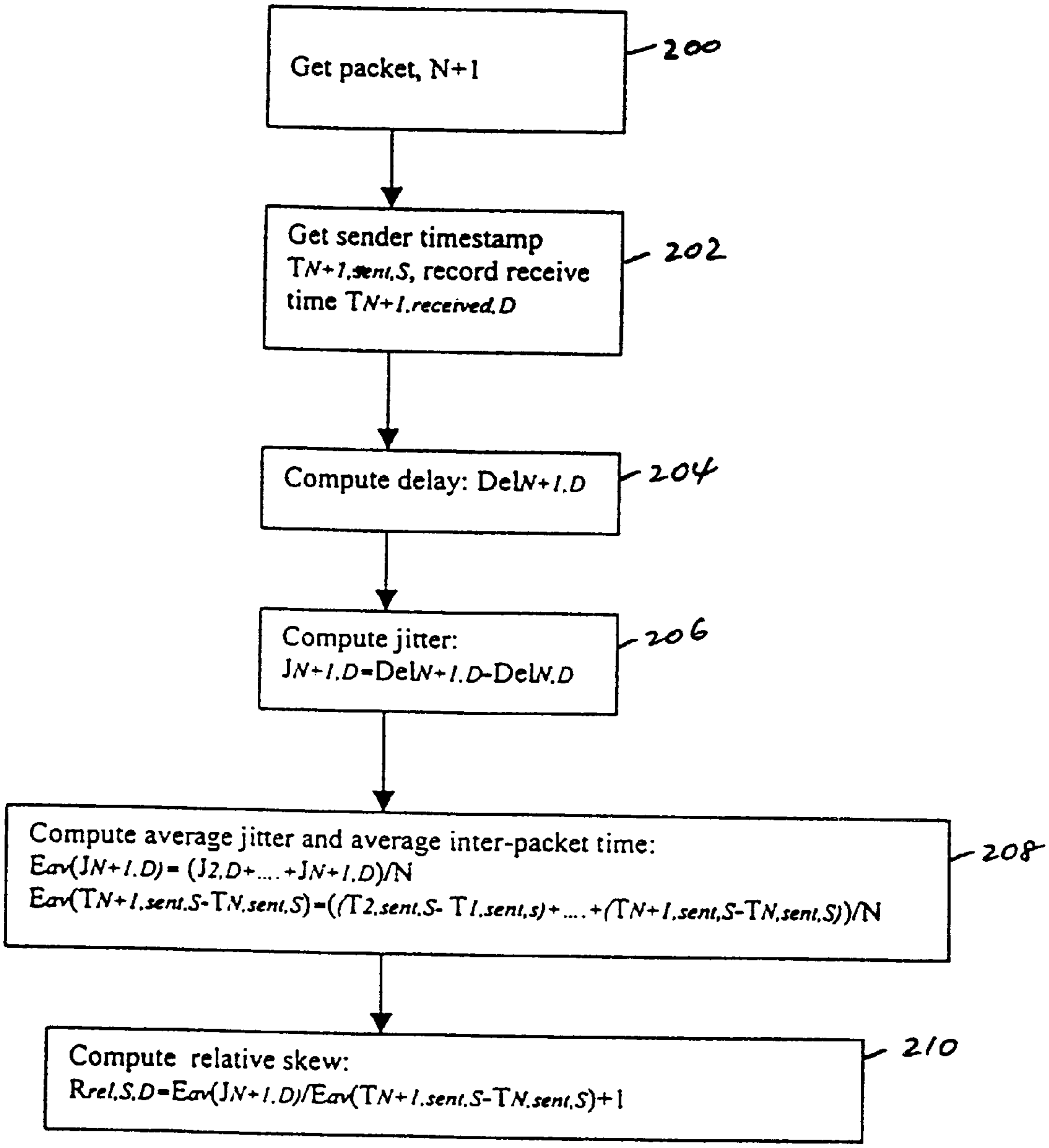
FIG. 2 is a flow chart diagram of one skew measurement scheme to be implemented at a receiver or a destination network node in accordance with the present invention.

The determination of the clock skew is made at the destination node 108 through the use of the relations specified in the equation described before. FIG. 2 shows an operation of the relative skew measurement at the destination node 108. The computation of a clock skew is made at the reception of each packet. The estimate of the overall clock skew becomes more and more accurate as more and more packets are received. It is appreciated that the flow chart shown in FIG. 2 is only for illustration, not for limitation. For example, the sequence of the measuring/estimating steps can be altered within the principles of the present invention.

In FIG. 2, a packet N+1 is received by a receiver in box 200. The receiver obtains the sender timestamp from the packet meanwhile recording the receiving time in box 202. A delay $Del_{N+1,D}$ is determined in box 204. A jitter is then computed in box 206. In box 208, an average jitter and an average inter-packet time are computed by averagers which are commonly used by a person skilled in the art. Finally, a relative skew $Rrel_{S,D}$ is determined in box 210.

Accordingly, the present invention provides a method for measuring/estimating the relative clock skew between network nodes in a packet based communication network. The potential use of such a scheme can be ranged from integration into applications to use by network operators as a performance measurement technique. Further, it is appreciated that the above clock skew measurement technique can be generally used for many other clock skew correction applications.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for determining a clock skew between at least a first and second clocks in a network, comprising:

transmitting a plurality of packets from a first network node to a second network node, each of the packets having a timestamp which records time measured by the first clock at the first network node;

receiving one of the packets at the second network node and recording time measured by the second clock at the second network node;

obtaining the timestamp of the one packet;

computing a time delay between a time of transmitting the one packet and a time of receiving the one packet;

computing a jitter between the time delay for the one packet and the time delay for a next packet consecutively transmitted after the one packet;

averaging jitters after transmitting the plurality of packets;

averaging inter-packet times, each of the inter-packet times being a time interval between transmitting two consecutive of the plurality of packets at the first network node; and determining the clock skew by dividing an average of the jitters by an average of the inter-packet times.

2. The method of claim 1, wherein the network is a packet based communication network.

3. The method of claim 1, wherein time recordings by the first and second clocks are relative to a global clock.

4. A system of determining a clock skew between at least a first and second clocks in a network, comprising:

a transmitter for transmitting a plurality of packets from a first network node to a second network node, each of the packets having a timestamp which records time measured by the first clock at the first network node;

a receiver for receiving one of the packets at the second network node and recording time measured by the second clock at the second network node; and means for determining a clock skew between the first and second clocks based on the timestamps and the time measured by the second clock, wherein the clock skew determining means includes:

means for obtaining the timestamp of the one packet recorded at the first clock;

means for computing a time delay between a time of transmitting the one packet and a time of receiving the one packet;

means for computing a jitter between the time delay for the one packet and the time delay for a next packet consecutively transmitted after the one packet;

a first averager averaging jitters after transmitting the plurality of packets; and a second averager averaging inter-packet times, each of the inter-packet times being a time interval between transmitting two consecutive of the plurality of packets at the first network node; wherein the clock skew is determined by dividing an average of the jitters by an average of the inter-packet times.

5. The system of claim 4, wherein the network is a packet based communication network.

6. The system of claim 4, wherein the time recordings by the first and second clocks are relative to a global clock.

7. An article of manufacture for a computer-based data processing system, the article of manufacture comprising a computer readable medium having instructions for causing a computer to perform a method for determining a clock skew between at least a first and second clocks in a network, comprising:

transmitting a plurality of packets from a first network node to a second network node, each of the packets having a timestamp which records time measured by the first clock at the first network node;

receiving one of the packets at the second network node and recording time measured by the second clock at the second network node;

obtaining the timestamp of the one packet;

computing a time delay between a time of transmitting the one packet and a time of receiving the one packet;

computing a jitter between the time delay for the one packet and the time delay for a next packet consecutively transmitted after the one packet;

averaging jitters after transmitting the plurality of packets;

averaging inter-packet times, each of the inter-packet times being a time interval between transmitting two consecutive of the plurality of packets at the first network node; and determining the clock skew by dividing an average of the jitters by an average of the inter-packet times.

8. The article of claim 7, wherein the network is a packet based communication network.

9. The article of manufacture of claim 7, wherein time recordings by the first and second clocks are relative to a global clock.

* * * * *